4,594,842

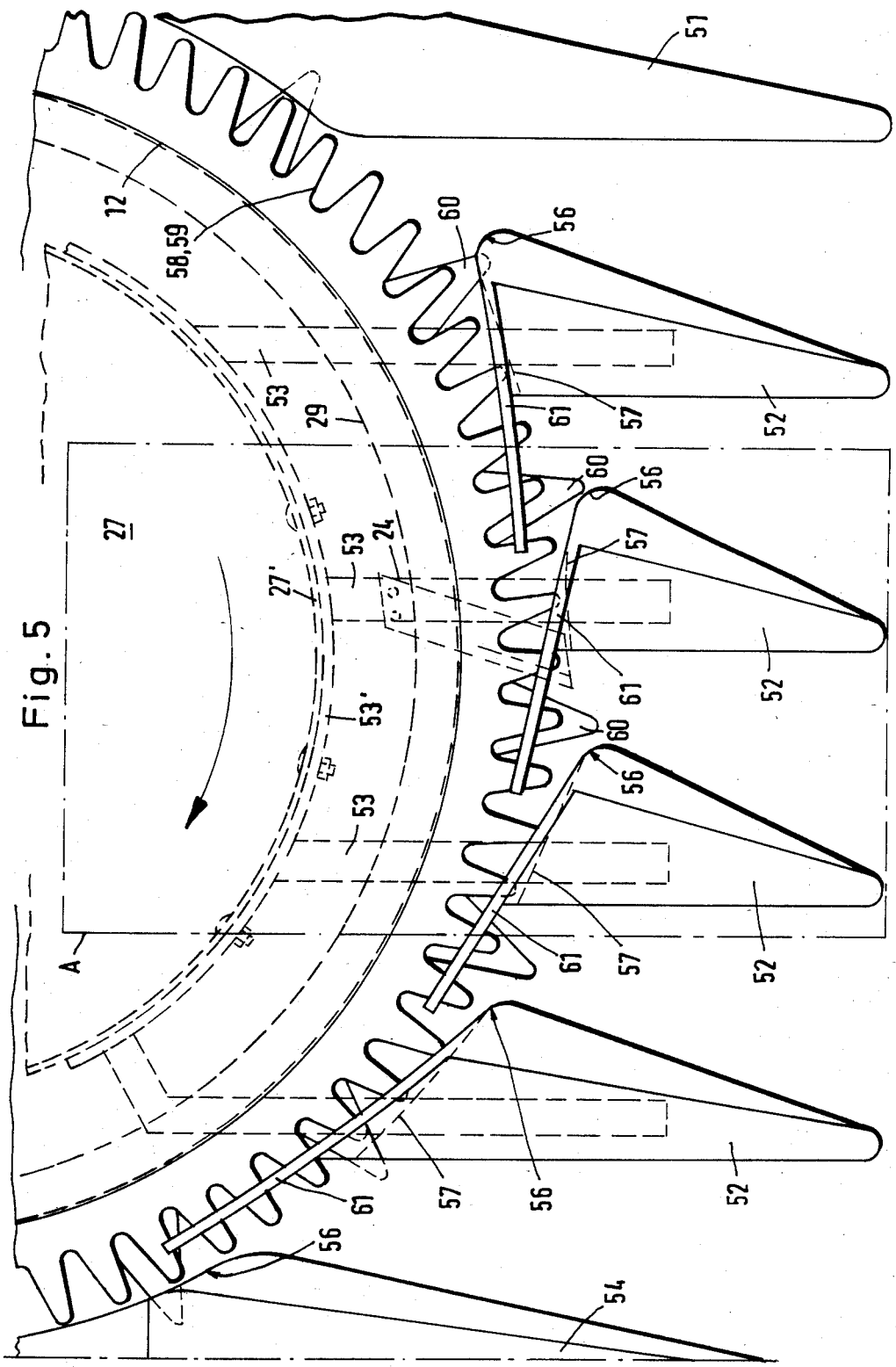

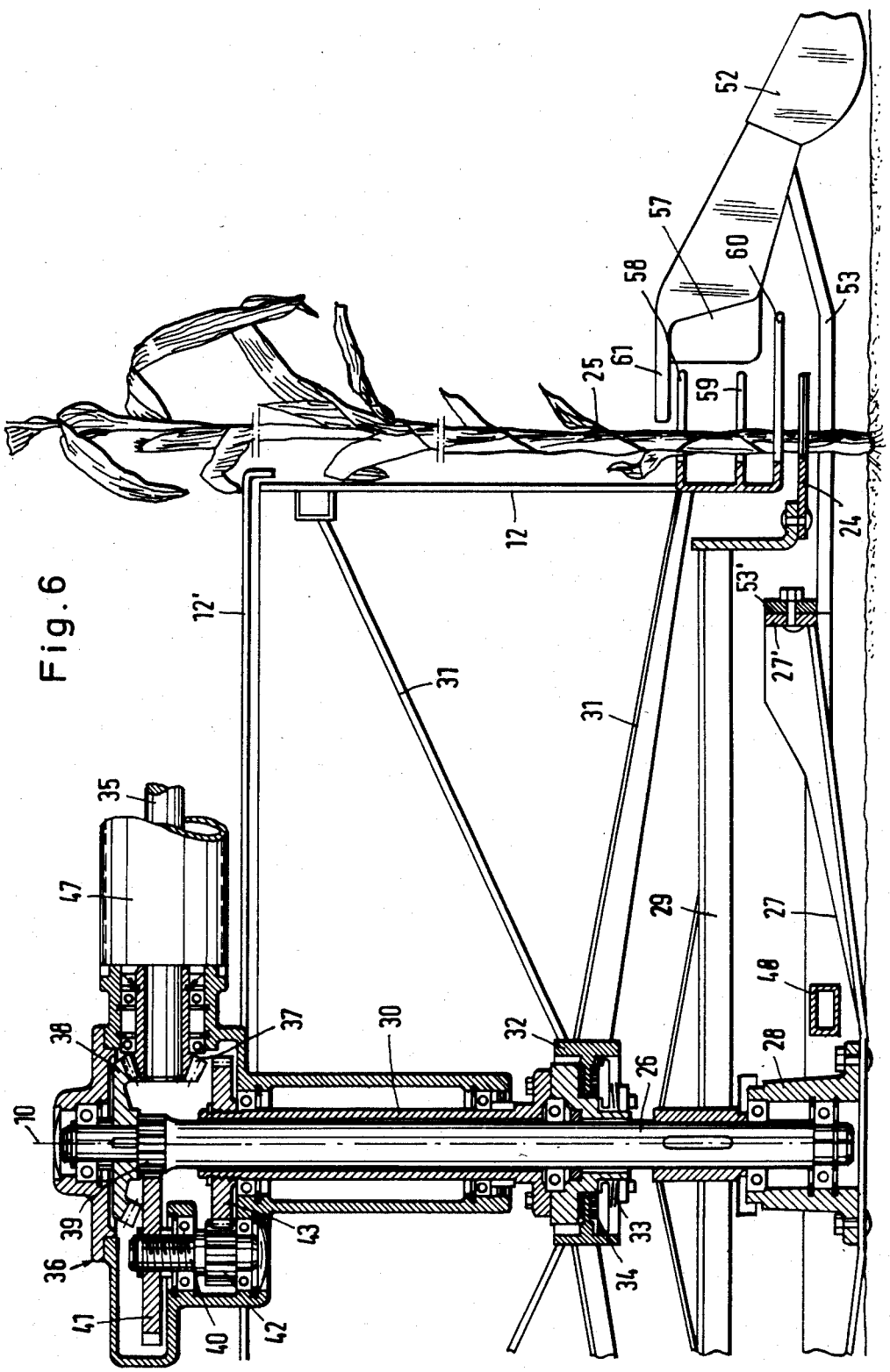

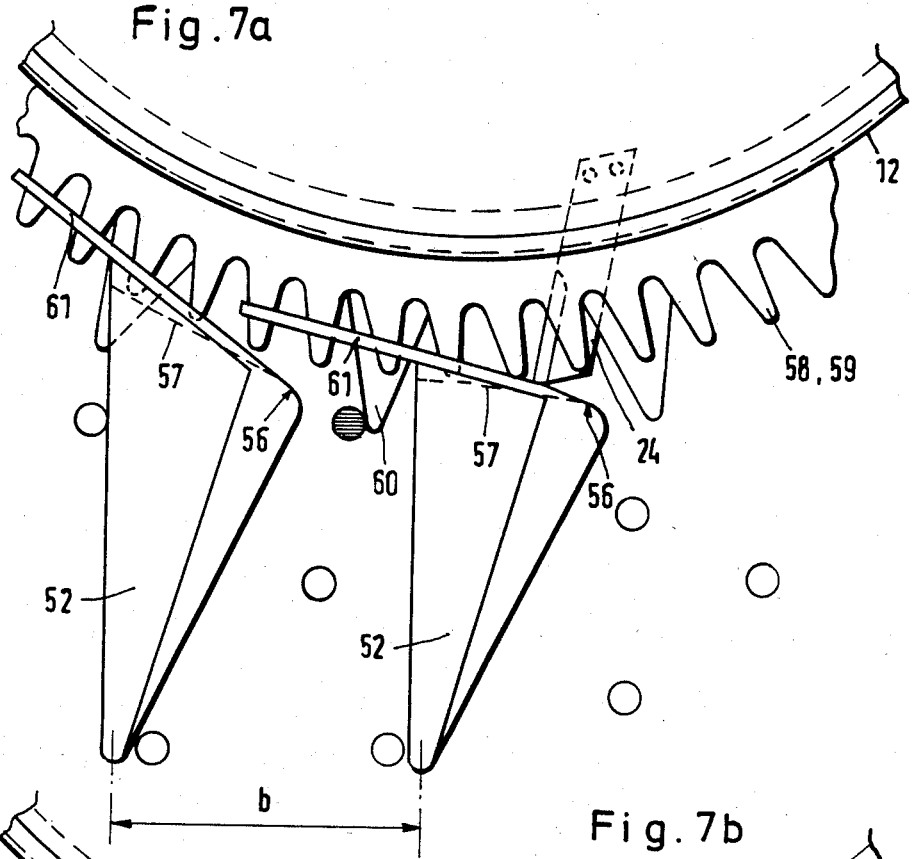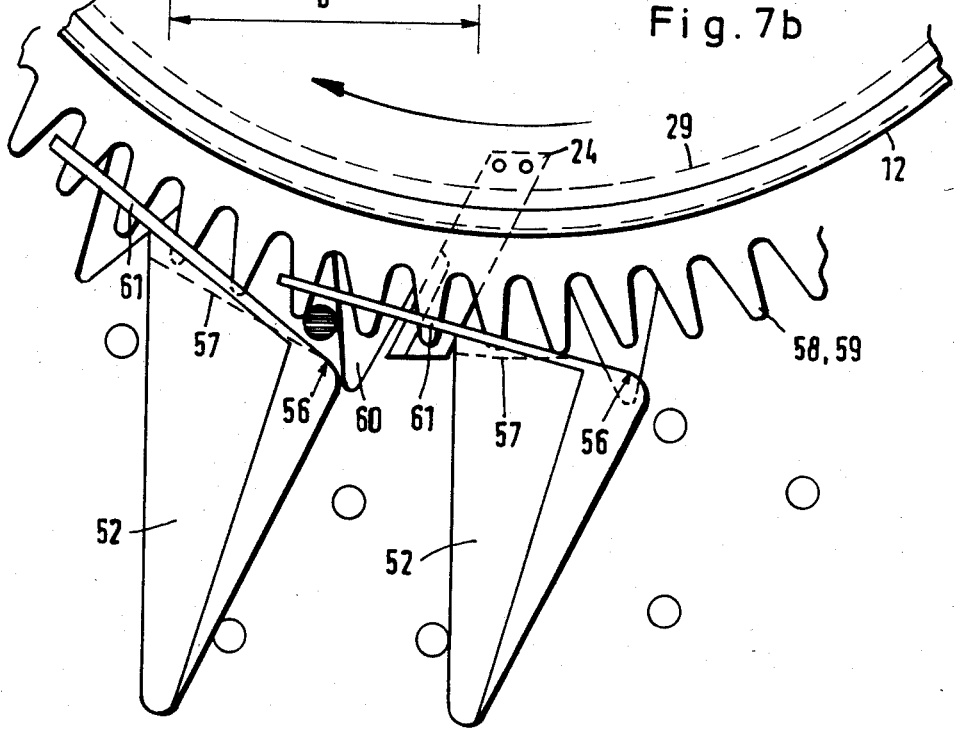

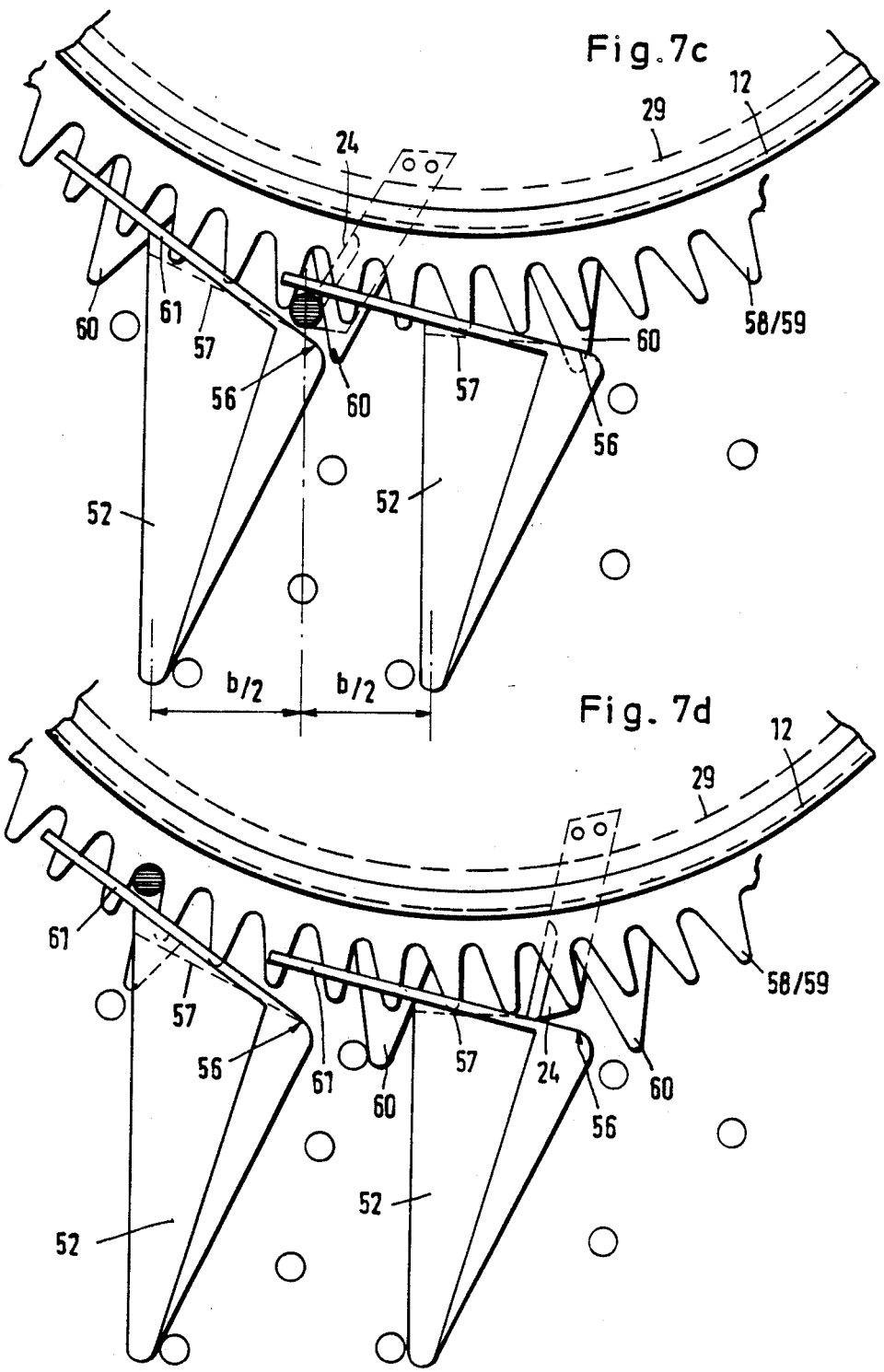

MACHINE FOR HARVESTING AND CHOPPING OF MAIZE OR SIMILAR STALK-TYPE HARVESTS

This application is a continuation of application Ser. No. 514,202, filed July 14, 1983, now abandoned.

BACKGROUND OF THE INVENTION

This invention relates to a machine for the harvesting and chopping-up of maize or similar stalk-type harvests, which draws-in and mows the stalks of the harvest in the upright position and subsequently feeds them to a chaff-blower, feed rollers being provided to feed the cut stalks to the chaff-blower, with which after the mowing the stalks of the harvested material are moved on and in co-operation with guide parts are brought forward in a slanting position in the direction of travel, in which their cut ends are caught in the feed rollers provided in front of the chaff-blower. Such machines are also often called forage harvesters.

The known machines of this kind, irrespective of the drawing-in system which they use or whether they are made for one or more rows, must always travel more or less accurately along the row of stalks and are bound to the distances between rows determined by the sowing. Attempts have already been made on multi-row machines to make the travelling accuracy along the rows less sensitive by the adjustability of the drawing-in elements, or to facilitate the work of the driver by incorporating automatic steering mechanisms. However, both methods are structurally expensive whilst the fact that the machine is bound to the row does not change.

It is, therefore, the aim of the invention to create a machine for the harvesting and chopping-up of maize or similar stalk-type harvests which can operate independent of the distances between the rows and the direction of the rows, i.e. a machine which can also be used for broadcast harvests (comparable to a harvester-thresher for grain). The machine must furthermore be able to pick up broken harvests, eg. flattened maize, without problems.

In order to achieve this aim the machine of the kind described and where in the direction of travel one or more rotating drawing-in and moving devices with in each instance several adjacent individual cutting widths formed by cutting points distributed over the front working range, are provided in front of the chaff-blower with feed rollers and at least the drawing-in and mowing devices positioned closest to the feed rollers at the same time form the transfer element for the cut harvested material fed in by the cutting points positioned further away from the feed rollers.

Particularly advantageous is a design of the cutting devices of the machine wherein the bottom peripheral edge of the rotating elements need no longer be machined, the precision adjustment at the support between the rotating elements with the cutting blades and the stationary counterblades falls away, and because there are no stationary counterblades the maintenance required during operation is practically zero, seeing that the mowing blades which rotate at a high speed in the manner of a rotary mower and cut or hit off the stalks of the harvested material in a clean manner, have a long service life.

Further features and details of this embodiment of the invention, in particular with regard to the obtaining of different cutting lengths, defined according to place and time, and in connection with the relation between the speed of travel of the machine, the peripheral speed of the rotating elements and the frequency of the rotor blades, are disclosed.

As was furthermore ascertained, this embodiment of the cutting devices according to the invention also renders possible an overall constructionally simplified design of the machine. It is, as a matter of fact, quite possible to increase the diameter of the rotating elements so considerably that the machine can be constructed with only two drawing-in and mowing devices provided in front of the feed rollers of the chaff blower, without reducing the overall operating width of the machine. Also a design with only one large drawing-in and mowing device, determining the overall operating width of the machine, is possible. A special advantage in this connection is that it is possible to provide an overhead drive for the rotating elements on the one hand and the mowing blades on the other hand, resulting in an overall reduction of the ground clearance of the machine.

In the following the subject of the invention will be explained in greater detail with reference to a drawing which diagrammatically illustrates two exemplified embodiments.

BRIEF DESCRIPTION OF THE DRAWINGS

FIG. 5 is a partial top view onto the, in the travelling direction, left working range of the machine of FIG. 4.

FIGS. 7a–d are partial top views onto an enlarged cutout A according to FIG. 5 showing four different operating phases.

DESCRIPTION OF THE PREFERRED EMBODIMENTS

Figure 1:
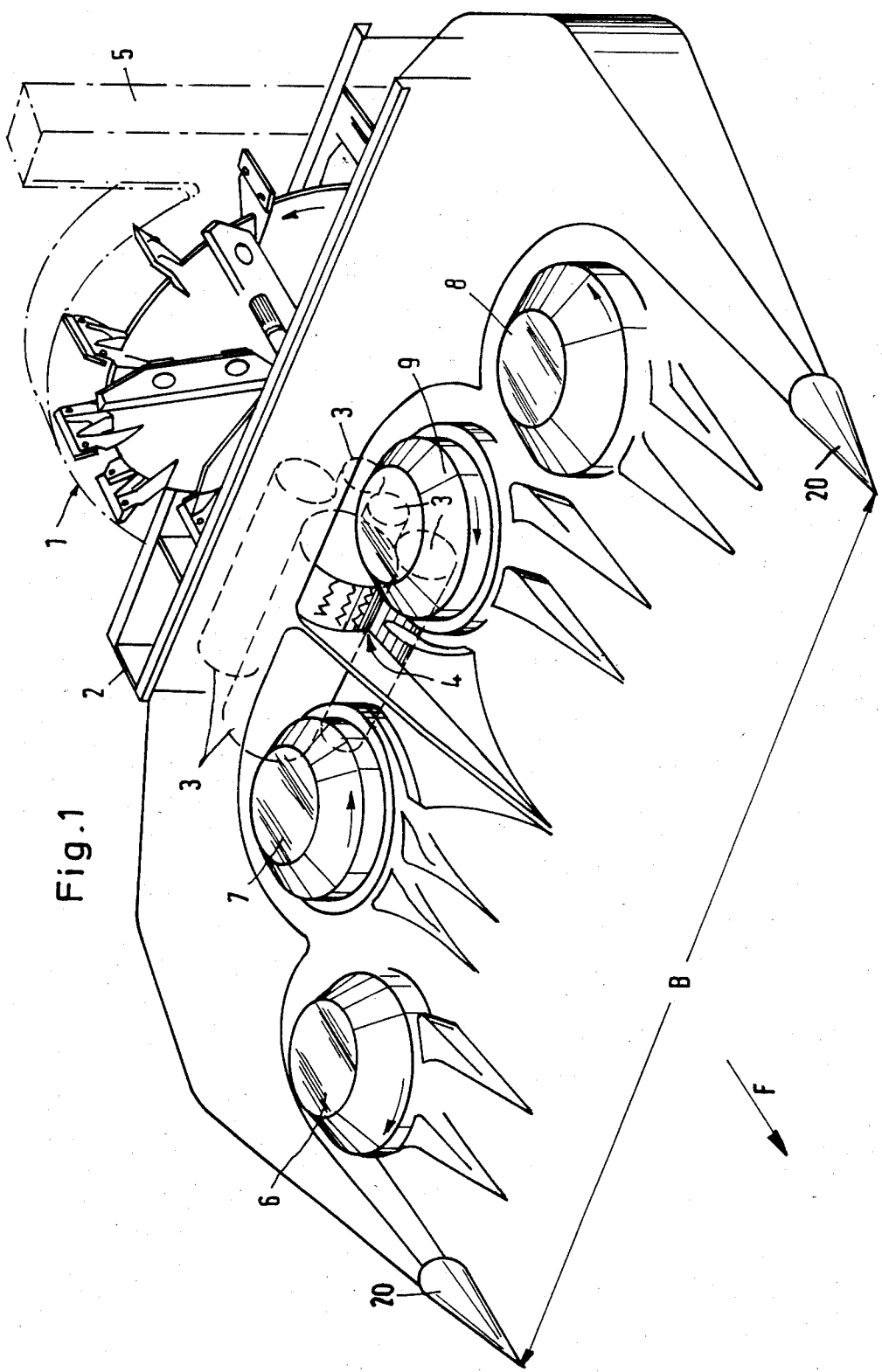
FIG. 1 is a perspective overall view of a first embodiment of a machine according to the invention.

The machine, which in FIG. 1 moves forward in the operating or travelling direction—arrow F—comprises a chaff blower which is arranged transversely to the direction of travel and is attached by means of its (non-illustrated) drive to a supporting frame 2. Positioned in front of the chaff blower are several driven feed rollers 3, between which a horizontal feed gap 4 is formed, and through which the harvested material is fed by the feed rollers 3 into the housing of the chaff blower 1, where it is comminuted and blown out upwards by way of a tangential discharge pipe 5. The feed gap 4 may be adjustable.

In order to feed the chaff blower 1 by way of the feed rollers 3, in the direction of travel F several—in the illustrated embodiment four—rotating drawing-in and moving devices 6, 7 and 8, 9 are provided in front thereof, with adjacent, individual working widths formed by several cutting points distributed over the front operating range. The drawing-in and mowing devices 7, 9 positioned closest to the feed rollers 3, at the same time form the transfer element for the cut harvested material fed in by the drawing-in and mowing devices 6, 8 arranged further away from the feed rollers 3.

As can be noted in particular from FIGS. 2 and 3, each of the drawing-in and mowing devices 6 to 9 consists of a rotating element 12 which rotates around a vertical or at least substantially vertical axis 10 and is provided on the periphery with grippers 11, 21, eg. in the form of toothed rims, and of guides 13, 13' . . . which extend circumferentially around certain regions, the design and function of which guides will be explained further on. Every rotating element 12, which expediently is provided in the form of a closed hollow part, is provided on the underside with cutting blades 14 in a number which corresponds to the number of grippers 11, 21, which project outwards beyond the periphery and expediently are arranged in such a manner that they can be replaced. These cutting blades 14 cooperate with several stationary counterblades 15 which define the cutting points. In the illustrated exemplified embodiment the four drawing-in and mowing devices 6 to 9 each cooperate, in their region which in the direction of travel lies at the front, with three counterblades 15 provided within a separate drawing-in gap 16. In this manner a relatively uniform stubble picture is obtained in the field within the overall working width B of the machine (e.g. 2.70 m), also when the machine is used for broadcast harvests. The more cutting points are provided on the drawing-in and mowing devices, the more uniform the stubble picture will become.

Figure 3:
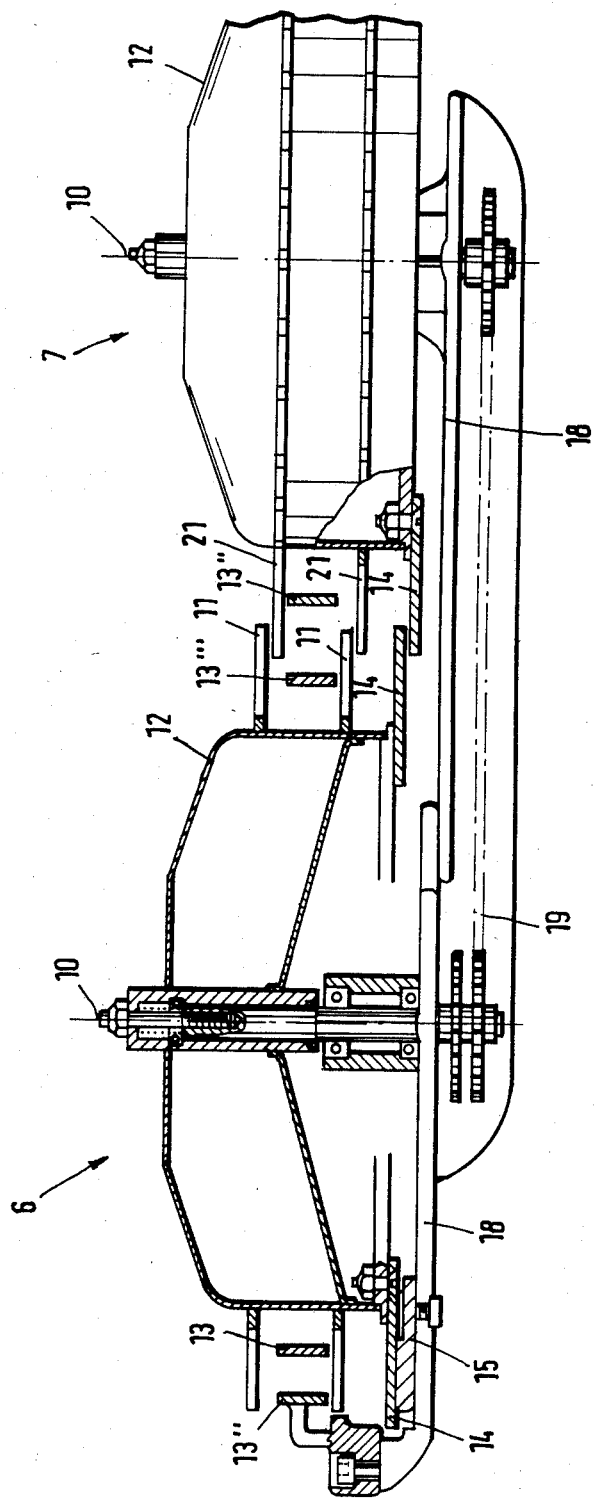
FIG. 3 is a view, partially cut, according to line III—III in FIG. 2.

As can also still be noted from FIG. 3, the rotating elements 12 of the drawing-in and mowing devices 6 to 9 rest on bottom arms or plates 18, and are also driven from underneath, e.g. by means of an enclosed chain-drive 19. The adjacent drawing-in and mowing devices 6, 7 and 8, 9 are in each instance driven in opposite directions as indicated by the arrows in FIG. 1, and the two drawing-in and mowing devices 7, 9 positioned closest to the feed rollers 3 feed the cut harvest to the feed rollers 3 in the same direction from the front.

When the machine, which may be pulled by a tractor or may also be self-propelled, is moved forward in the direction of travel F, then irrespective of the distance between the rows and the direction of the rows, within the entire working width B determined by the two outer guides 20, all the harvested material is picked-up by the four drawing-in and mowing devices 6 to 9, i.e. also the broadcast harvest, cut in the upright position and is then with the cut-off ends fed into the feed rollers 3, the stalks being positioned slightly inclined forwards in the direction of travel F. The material cut by the two outer drawing-in and mowing devices 6, 8 is first passed on to the offset drawing-in and mowing devices 7, 9 positioned nearest to the feed rollers 3, and from there, together with the material cut there, is fed to the feed rollers 3 in the same direction from the front. It is expedient when the drawing-in and mowing devices 7, 9, which also act as transfer elements, are provided with gripper rims 21, between which a guide 13''' forms a transfer duct 23 (FIG. 2) which keeps the harvest taken over from devices 6, 8 separate from its own harvest. In this manner the cut harvest of the drawing-in and mowing devices 7, 9 acting as transfer element gets to the feed rollers 3 in the form of two separate strands, as indicated by broken or dotted lines in FIG. 2.

Figure 2:
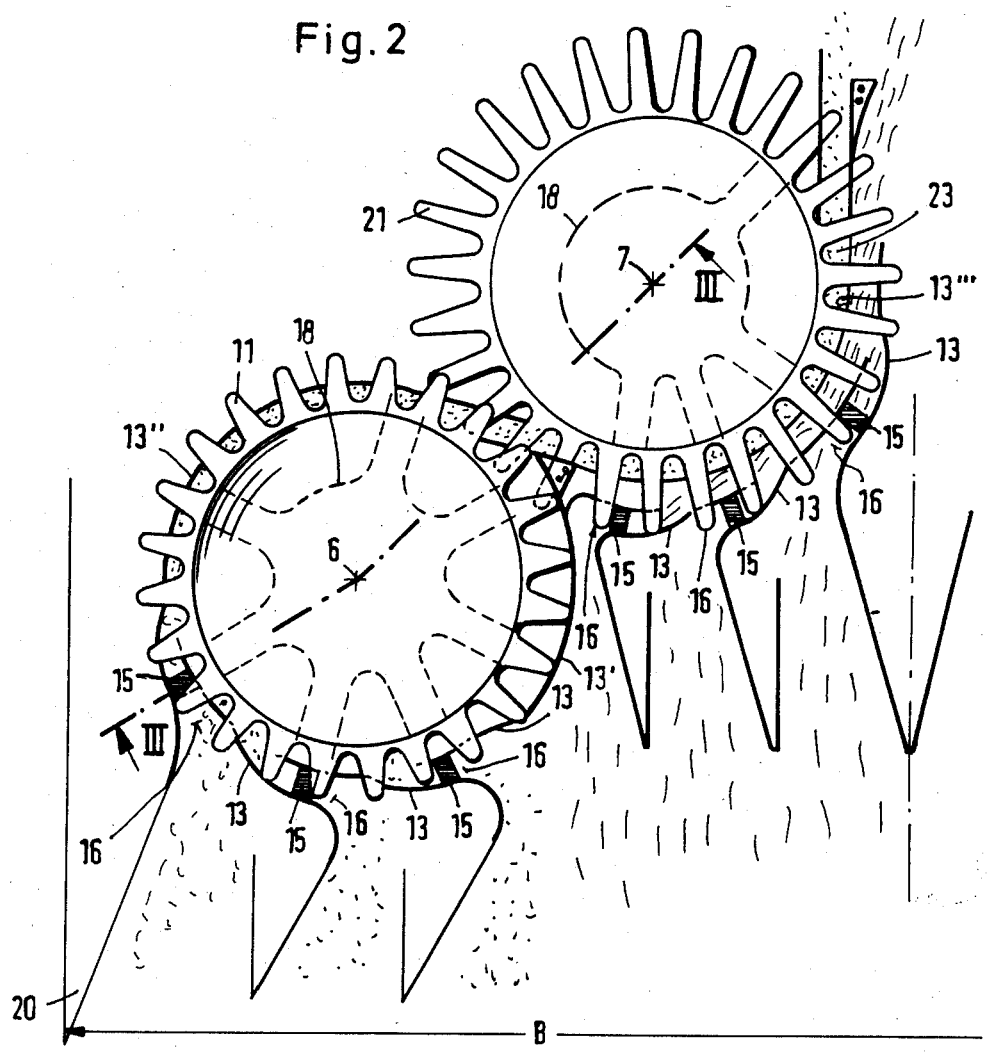
FIG. 2 is a partial top view onto two adjacent drawing-in and mowing devices of the machine of FIG. 1 on an enlarged scale.

The embodiment of the machine according to FIG. 1 to 3 can very easily be modified in that in place of the illustrated four drawing-in and mowing devices 6 to 9 also six of such devices may be provided, for example also with different diameters, in which case the drawing-in and mowing devices positioned nearest to the feed rollers would have to be provided with a sufficiently large capacity for the transferred material. It is also possible to reduce the number of drawing-in and mowing devices to, for example, two. The working width B of the machine—at an unchanged diameter of the rotating elements—would then be correspondingly smaller, but the advantage of the machine operating independent of the distance between rows and the direction of the rows would also in this case be retained. Also with regard to the structural design of the rotating elements forming the drawing-in and mowing devices with the grippers and guides, different constructions are possible.

A second, particularly advantageous embodiment of the machine is illustrated in FIGS. 4 to 7. As can first of all be noted from FIG. 4, the machine moved forward in the operating or travelling direction—arrow F—is provided, the same as the embodiment of FIGS. 1 to 3, with a chaff-blower 1 arranged cross-wise to the direction of travel, which with its drive is attached to a supporting frame (not illustrated). In front of the chaff-blower 1 several driven feed rollers 3 are provided inbetween which a more or less wide, possibly also adjustable, horizontal feed gap is formed, through which the harvested material fed to the feed rollers 3 gets into the housing of the chaff-blower 1, where it is comminuted and blown out upwards by way of a tangential discharge duct 5.

To feed the feed rollers 3 of the chaff-blower 1, in the direction of travel F several—in the illustrated, preferred exemplified embodiment only two—rotating drawing-in and mowing devices 7, 9 are provided in front thereof, with adjacent individual working widths formed by several cutting points distributed over the front operating range.

Figure 6:
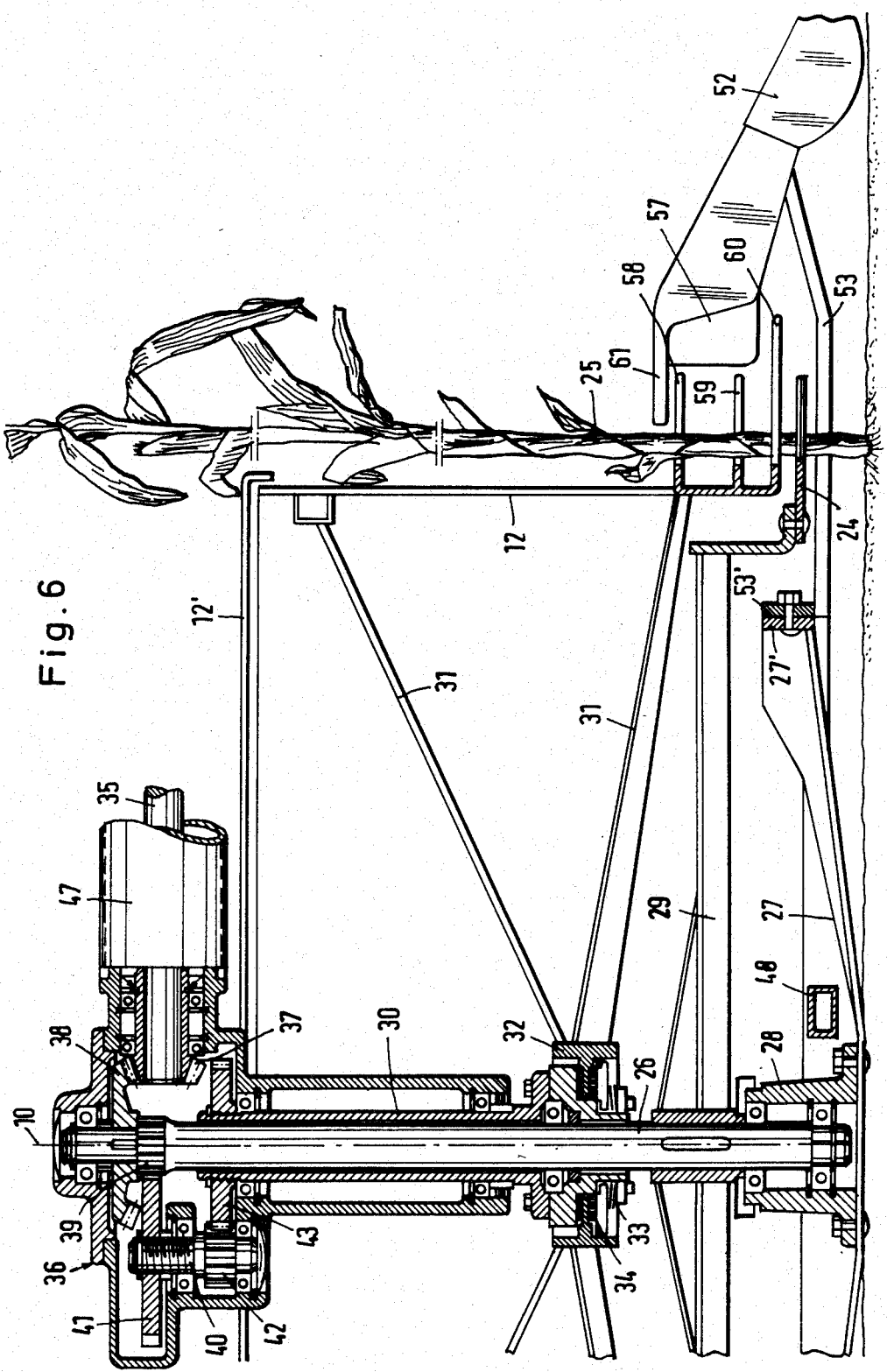
FIG. 6 is a vertical partial section approximately along line VI—VI of FIG. 4, with a drive mechanism for the rotating elements and cutting device which has been turned by 90° in the drawing plane.
Figure 4:
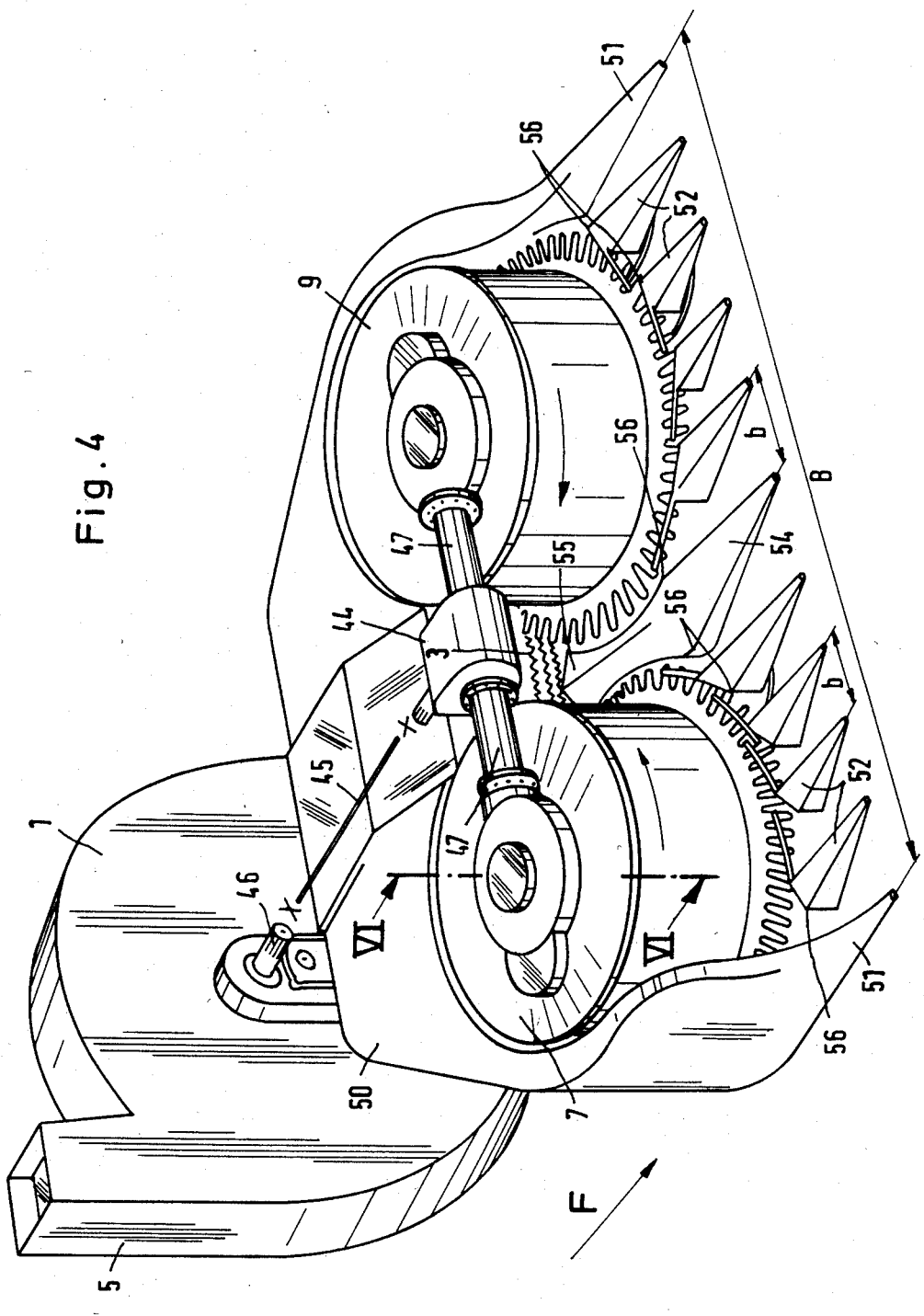
FIG. 4 is a perspective overall view of a second, particularly advantageous embodiment of a machine according to the invention.

As can be noted in particular from FIGS. 4 and 6, each of the two drawing-in and mowing devices 7, 9—the same as with the machine of FIGS. 1 to 3—consists of a rotating element 12 which rotates around a vertical or at least substantially vertical axis 10 and is provided on the periphery with grippers or gripper rims. A cutting device is arranged underneath each rotating element 12, which expediently is provided in the form of a hollow cylinder with top cover 12'.

Unlike the embodiment of FIGS. 1 to 3, the cutting device comprises driven mowing blades 24 which rotate independently of the associated rotating element 12, but at a considerably higher speed, and which cut off the stalks 25 in the manner of a rotary mower in a free cut, i.e. without stationary counter-blade. As can be noted in detail from FIG. 6, for the drive of the mowing blades 24 a drive shaft 26 is provided which extends through the rotating element 12, the centre axis of which drive shaft 26 divides or coincides with the vertical or substantially vertical rotating axis 10 of the rotating element 12. The bottom end of the drive shaft 26 is positioned and supported in a hub 28 provided on a slide piece 27, eg. in the form of a skid. A rotor 29 fixed to the drive shaft 26, which expediently is located inside the casing of the rotating element 12, is on its periphery provided with the mowing blades 24, which extend to under the casing of the rotating element and project outwards beyond same.

Above the mowing rotor 29, on the drive shaft 26 and co-axially to same, a hollow shaft 30 is positioned which drives the rotating element 12. To this effect the rotating element 12 may on the inside be provided with steadying struts 31 attached to the casing, the other end of which is attached to a hub ring 32. The hub ring 32 is drive-coupled to the bottom end of the hollow shaft, either rigidly or, as shown in FIG. 3, by way of a friction coupling 34 kept under tension by springs 33. This provides an overload protection for the rotating element 12.

As can furthermore be noted from FIG. 6, the drive of the drive shaft 26 for the mowing rotor 24, 29 and the hollow shaft 30 for the rotating element 12 takes place from overhead by means of a common drive in put shaft 35 which—as can be noted from FIG. 4—is arranged above the rotating element 12 in a horizontal position and cross-wise to the direction of travel, but which in FIG. 6 is shown turned by 90° in the drawing plane.

The drive input shaft 35 leads into a gear block 36, in which the top ends of the drive shaft 26 and the hollow shaft 30 are positioned and are coupled to one another in such a manner that the speed supplied by the drive input shaft 35 is split into two different speeds.

This can, for example, be done in such a manner that the drive input shaft 35 is provided on its end leading into the gear block 36 with a bevel pinion 37, which meshes with a bevel gear 38 attached to the drive shaft 26 for the mowing rotor 24, 29 with a reduction of, for example, 1:2, so that the speed for the mowing rotor is half the speed of the input shaft. A pinion 39 formed or put onto the drive shaft 26 underneath the bevel gear 38 meshes with a gear wheel 41 provide on an intermediate shaft 40 in the gear block 36 with a reduction of, for example, 1:5 furnishing the speed of the intermediate shaft which by way of a pinion 42 with a further reduction of, for example, 1:4 is transmitted to a gear wheel 43 attached onto the hollow shaft 30, giving the speed of the rotating element 12. Assuming that the speed of the drive input shaft 35 is 1000 r.p.m., with the reductions indicated as an example, one would obtain a speed of 500 r.p.m. for the drive shaft 26 of the mowing rotor 24, 29 and of 25 r.p.m. for the hollow drive shaft 30 of the rotating element 12, ie. a ratio of the drive speeds of 1:20.

As can be noted from FIG. 4, the drive-input shafts for the two drawing-in and mowing devices 7,9 are coupled to one another in the centre by a common miter gear 44, which in turn is driven by way of a cardan shaft 45 or the like by an overhead shaft 45 of the chaff-blower 1, preferably at the same speed as same, i.e. for example also at 1000 r.p.m. In this connection it is expedient when the two drive input shafts 34, which are enclosed in a pipe 47, and the common miter gear 44 are arranged above and in front of the feed rollers 3 of the chaff-blower 1 in such a manner that they form an abutment or guide part which assists the slanting position of the stalks for feeding them into the feed rollers. At the same time the pipes 47 which enclose the drive input shaft 35 and are attached to the common miter gear 44 as well to the gear block 36, form an upper support bridge for the two drawing-in and mowing devices 7, 9, which on the underside is supplemented by a cross-tie 48 by which the two slide pieces 27 eg. skids, are supported against one another (FIG. 6).

As can be furthermore noted from FIGS. 4 and 6, the two drawing-in and mowing devices 7, 9 are enclosed at the rear, i.e. at the side opposite to the direction of travel F, by a housing 50 which also covers the feed rollers 3 of the chaff-blower 1, which housing 50 with a concentric curvature also engages around the sides of the two drawing-in and mowing devices 7, 9, and ends in divider points 51 pointing to the front, i.e. in the direction of travel F of the machine. The distance between these two divider points 51 determines the overall working width B of the machine. Within this overall working width further divider points 52 are associated with each drawing-in and mowing device 7, 9, the undersides of which are fastened to a supporting bar 53 which expediently is attached to the slide piece 27 in a detachable manner, and extends underneath the rotating element 12 and the mowing blades 24. The slide piece 27 may in this case have a half ring 27', the supporting rods 53 being flanged onto same by a circular section 53' connecting them (FIGS. 5 and 6). Furthermore a central divider point 54 is provided between the two drawing-in and mowing devices 7, 9, the rear part of which may expediently be designed as a bottom guide surface 55 for the formed parcel of cut stalks when these are fed into the feed rollers 3 of the chaff-blower 1.

Similar to the embodiment of FIGS. 1–3, all divider points 51, 52, 54, extend parallel to one another in the direction of travel F of the machine and are arranged next to one another at the same distances b. The distances b between the divider points together form the overall working width B of the machine. In the case of the embodiment of FIG. 4 with a total of eleven divider points and ten distances or individual working widths b, for b=0.24 m, the overall working width is therefore B=2.40 m.

The same as with the machine of FIGS. 1 to 3, also here—except for the two lateral divider points 51—each of the divider points 52 forms a defined drawing-in and cutting point 56 for the stalks, whereas the central divider point 54 forms two drawing-in and cutting points, one for the drawing-in and mowing device 7, the other for the drawing-in and mowing device 9. The one surface of the divider points 52 which extends parallel to the direction of travel F of the machine, whereas the other surface which extends against the direction of rotation of the rotating elements—as well as the two surfaces of the central divider points 54—enclose such an angle with the direction of travel that the drawing-in and cutting point 56 is always positioned at about b/2. And, the same as for the machine according to FIGS. 1 to 3, it also here applies that the more drawing-in and cutting points (equals individual working widths b) are provided on the drawing-in and mowing devices, the more uniform the stubble pattern will be, in particular when used for broadcast harvests. However, whereas with the machine of FIGS. 1 to 3 the individual cutting points are clearly defined by stationery counter blades, with the embodiment of the machine according to FIGS. 4 to 7, with which the stalks are cut by the mowing rotor 24, 29 in free cut, special measures and an adaptation of several factors are required, so that also here the desired, timed and locally defined drawing-in and cutting points 56 are obtained:

As can be noted from FIGS. 5 and 6, the divider points 52, 54 form, at their rear facing the drawing-in and mowing devices 7, 9, vertical supporting and guide surfaces 57, which in the direction of rotation of the rotating elements 12 at first extend in a straight line or plane, slightly inclined in relation to the periphery of the associated rotating element.

When, as illustrated, at the bottom edge of each rotating element 12 two gripper tooth rims 58, 59 are provided at a distance above one another, with the same close pitch, the bottom of the teeth corresponding approximately to the diameter of a stalk, and when in a plane positioned underneath same a further rim is arranged with a lesser number (eg. 24) of longer gripping teeth 60 which project outwards beyond the periphery of the gripper teeth rims 58, 59 (FIG. 6), then the supporting and guide surfaces 57 form a drawing-in gap which extends from the peripheral circle of the gripping teeth 60 to the peripheral circle of the two gripper teeth rims 58, 59, bridging the vertical distance between the two gripper teeth rims 58, 59, in such a manner that their gripper teeth pass over the rear region of the supporting and guide surfaces 57 at only a slight distance, whereas the gripping teeth 60 pass underneath the supporting and guide surfaces 57 forming the rear of the divider points 52, 54. At the upper edge of each supporting and guide surface or slightly above same, guide fingers 61 are provided, which at first extend longitudinally flush and parallel with the supporting and guide surfaces 57, and then extend above the top gripper teeth rim 58 into the peripheral circle thereof, into a region positioned behind the rear supporting and guide surface of the in the direction of rotation adjacent divider point (FIG. 5). These guide fingers 61 ensure, that cut stalks are always pressed into the tooth base of the gripper tooth rims 58, 59, are kept there and taken along by same, and in this manner pass the subsequent drawing-in and cutting points 56 separate from the additional stalks which are being picked up.

FIGS. 7a to d show, in chronological sequence, four different working phases which occur during the use of the machine, for a working width b. FIG. 7a shows how a stalk which during the forward movement of the machine in the direction of travel F has got between two divider points 52 and into the peripheral circle of the gripping teeth 60, is grabbed by one of these gripping teeth, and under the influence of the further forward movement of the machine as well as the rotational movement of the rotating element with the gripping teeth, is drawn in the direction against the supporting and guide surface 57 of the adjacent divider point. FIG. 7b shows the stalk in its draw-in position, in which it is located directly behind the front corner at the rear of the divider point, related to the direction of rotation, and is held there between the supporting and guide surface 57 thereof, the guide finger 61 as well as between the gripping tooth 60 and the backs of adjacent teeth of the two superimposed gripper tooth rims 58, 59. FIG. 7c shows the cutting by one of the blades 24 of rotor 29 which takes place at this moment and at this point. FIG. 7d shows the cut stalk being moved on in the direction of rotation towards the feed rollers 3 of the chaff-blower 1; it can be noted that the cut stalk is pressed by the guide finger 61 of the divider point into the tooth base of the two upper gripper tooth rims 58, 59, and in this manner can pass the next cutting point or points separately from other stalks coming in, until it is released from the gripper tooth rims 58, 59 just in front of the feed rollers 3 of the chaff-blower 1, possibly with the aid of strippers engaging between same, and moves with the cut end at the front against the direction of travel F of the machine between the feed rollers 3. From FIG. 7d it can also be noted that a next stalk has already been grabbed by a further gripping tooth 60 and is drawn-in by same to the divider point, i.e. phase 1 is repeated.

However, the illustration of the four different phases according to FIGS. 7a to 7d must only be regarded as idealised and diagrammatic.

When the stalks follow one another very closely in the zone between two divider points, i.e. at a particularly small distance between stalks and/or a high travelling speed, it may well happen that the stalks are not only grapped and drawn-in by the long gripping teeth 60, but also engage directly into the teeth of the gripper tooth rims 58, 59 in the space between two gripping teeth 60, and are drawn-in by same behind the next divider point to the drawing-in and cutting point 56. There they are cut off in the same manner as shown in FIG. 7c, and are then moved on by the gripper tooth rims. This means that the machine can also be used for harvests where the stalks are very close together, eg. for rape. When harvesting maize, the stalks of which must at any rate be spaced at a specific minimum distance from one another, also in the case of broadcast material, under normal conditions, i.e. when the stalks are upright and at not too high a travelling speed, one will obtain approximately a sequence according to FIGS. 7a to 7d, i.e. each of the stalks will be grabbed and drawn-in mainly by the gripping teeth 60.

Irrespective of whether the stalks are drawn-in by the gripping teeth 60 and/or the teeth of the gripper tooth rims 58, 59, because of the dimensioning of the number and the peripheral speed of the mowing blade 24 in dependence on the peripheral speed of the rotating element 12, it is always ensured that a cutting frequency is obtained which cuts the drawn-in stalks always at the same drawing-in and cutting point 56 (see FIGS. 7b and c). The relations which in this connection apply between the speed or peripheral speed of the rotating elements, the travelling speed of the machine and the speed or peripheral speed of the mowing rotors and accordingly the cutting sequence or cutting frequency will in the following be explained in greater detail with reference to a numerical example:

Based on the requirement that the peripheral speed of the rotating elements 12 must correspond approximately to the running-in speed of the stalks 25 into the chaff-blower 1, so that no accumulation of material will occur in front of the feed rollers, it will be assumed that the peripheral speed of the feed rollers is 2 m/sec, and accordingly also the feed or running-in speed of the cut stalks will reach approximately this value. It is furthermore assumed that with the machine illustrated in the drawing the two rotating elements 12 have in the zone of the gripping teeth 60 a diameter of 1.5 m.

From the applicable equation:

$$\text{Speed of rotating element} = \frac{\text{peripheral speed of rotating element}}{\text{circumference of rotating element}}$$

$$= \frac{2 \text{ m/sec}}{1.5 \, \pi \text{ m}}$$

a speed of 0.4 rev/sec (=24 r.p.m.) is calculated for each rotating element.

It will furthermore be assumed that the mowing rotor 24, 29 has a slightly smaller diameter of 1.4 m and that its speed—as already indicated above in the numerical example—lies in the ratio of 20:1 to the speed of the rotating element 12. The speed of the mowing rotor 24, 29 is therefore 8 rev/sec (=480 r.p.m.) and accordingly the Peripheral speed of the mowing rotor=8 sec$^{-1}.\pi.$ 1.4 m=35 m/sec.

This peripheral speed of the mowing rotor suffices to knock off the stalk type harvest by a free cut, but on the other hand is not yet so high that the stalks could be pushed away.

If one furthermore assumes—as already indicated above, that at an overall working width of the machine of B=2.40 m, the individual working widths or distances between divider points are b=0.24 m, and assuming furthermore that (because of the conical shape of the divider points) at the rear of the divider points drawing-in and cutting points 56 for the stalk occur at about b/2=0.12 m, then the time required so that the stalk which runs in in the most unfavourable manner according to FIG. 7a is moved by the long gripping tooth 60 of the rotating element 12 into the drawing-in and cutting position 56, is determined by the equation.

$$\text{Drawing-in time} = \frac{\text{drawing-in path}}{\text{peripheral speed of rotating element}}$$

$$= \frac{0,12 \text{ m}}{2 \text{ m/sec}}$$

$$= 0,06 \text{ sec.}$$

At a travelling speed of the machine of 7.2 km/h=2 m/sec, which corresponds to the peripheral speed of the rotating elements during the 0.06 sec the machine also moves 0.12 m closer to the stalk to be cut, so that the cutting position according to FIGS. 7b and c is reached exactly.

From this it follows for the mowing rotor, that in each instance at this interval, i.e. every 0.06 sec, a cutting operation must take place so that every stalk brought into the position according FIG. 7b is cut off there according to FIG. 7c. At the assumed mowing rotor speed of 8 rev/sec and the drawing-in time of 0.06 sec, the number of required mowing blades for the mowing rotor is calculated from the equation $$\text{Number of mowing blades} = \frac{1}{0,06 \text{ sec. } 8 \text{ rev/sec}}$$

$$\approx 2,$$

ie. at least 2 mowing blades are required.

When the machine is used for other harvests, which compared to maize stand very close together, such as for example rape, it is recommended that, based on the same values of the above numerical example, the number of blades on the mowing rotor is increased to 3 so that an even higher cutting frequency will be obtained, and so as to ensure that every stalk located in the drawing-in and cutting position according to FIGS. 7b and c is also cut off there.

Figure 8:
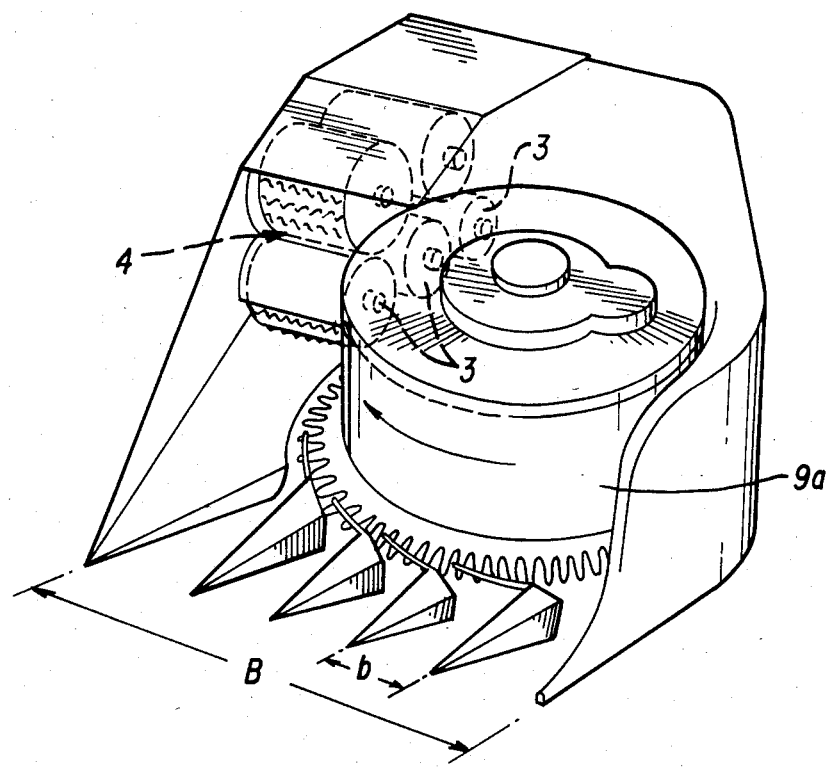
FIG. 8 is a schematic top view of an alternate embodiment.

Also the embodiment of FIGS. 4 to 7 is not limited to the illustrated example described in greater detail in the foregoing. This applies in particular to the numerical data, which at any rate are to be understood as an example only. Although the design of the machine according to claim 7 renders possible the particularly preferred embodiment according to FIGS. 4 to 7, and in addition also permits a construction, as shown in FIG. 8, with only one mowing and drawing-in device offset to one side of the feed rollers, i.e. also a machine split down the middle according to FIG. 4, this design can also advantageously be used for machines equipped with several individual drawing-in and mowing devices, e.g. according to the exemplified embodiment of FIGS. 1 to 3 with four rotating individual drawing-in and mowing devices.

For this one only requires a further drive transmission from the two drawing-in and mowing devices closest to the feed rollers of the chaff-blower to the other drawing-in and mowing devices, which can take place by way of drive couplings provided underneath, in the same manner in which it is any way possible to provide instead of the overhead drive for the rotating elements and mowing rotors illustrated and described in FIGS. 4 to 7, a corresponding underneath drive, or an overhead drive of the rotating elements and underneath drive of the mowing rotors (for example in the case of a non-coaxial arrangement of the two parts).

We claim:

1. A machine for harvesting and chopping up maize or, similar stalk-type harvests comprising a chaff-blower, feed rollers for feeding cut stalks to said chaff-blower, spaced guide means for guiding stalks to be cut, and drawing-in and mowing means rotatable about a substantially vertical axis and operable to draw in and mow the stalks of the harvest in the upright position and subsequently deliver the cut stalks to said feed rollers with the cut-off ends of the stalks facing said feed rollers, said spaced guide means being disposed forwardly of said drawing-in and mowing means for guiding said stalks to said drawing-in and mowing means as the machine is moved forwardly, and spaced guide means comprising two outer guide elements disposed laterally outwardly of said drawing-in and mowing means, said two outer guide elements having forward extending end portions which are spaced from one another by a distance which defines the cutting width of the machine, said drawing-in and mowing means being operable to drawn in and cut a plurality of stalks within said cutting width at a plurality of drawn-in and mowing locations spaced laterally across the front of the machine, said plurality of drawing-in and mowing locations and said guide means being operable to harvest crops within said cutting width independently of the distance between the rows and the direction of the rows of said stalks to be harvested.

2. A machine according to claim 1, wherein said drawing-in and mowing means comprises a rotating element rotatable about a substantially vertical axis, said rotating element having gripper means about the periphery thereof for engaging and displacing said stalks, and cutting means underlying said gripper means.

3. A machine according to claim 2, wherein said cutting means comprises cutting blades mounted to rotate with said rotating element, said cutting blades underlying said gripper means, and stationary counter-blades disposed to cooperate with the rotating cutting blades to cut said stalks, said stationary counter-blades defining said draw-in and mowing locations.

4. A machine according to claim 2, wherein said cutting means comprises cutting blades rotatable independently of the associated rotating element, and drive means for rotating said cutting blades at a peripheral speed higher than the peripheral speed of said rotating element, said cutting blades cutting said stalks with a free cut.

5. A machine according to claim 2 further comprising supporting means for supporting said guide means generally forwardly of said drawing-in and mowing locations, said support means being disposed ahead of said drawing-in and mowing locations considered in the rotational direction of said rotating element.

6. A machine according to claim 1, wherein two drawing-in and mowing means are provided, said two drawing-in and mowing means being disposed in front of said feed rollers, each of said two drawing-in and mowing means having an overall diameter to provide a working width of the machine within the range of about 2 to 3 meters.

7. A machine according to claim 6, wherein there are at least five drawing-in and mowing locations for each of said drawing-in and mowing means.

8. A machine according to claim 1, wherein only one drawing-in and mowing means is provided, said one drawing-in and mowing means being laterally offset relative to said feeding rollers.

9. A machine according to claim 2 further comprising driving means for driving said feed rollers at a peripheral speed which corresponds approximately to the traveling speed of the machine, said drive means also driving said chaff-blower and said gripper means at a peripheral speed substantially equal to the first said peripheral speed, said cutting means comprising at least two rotating blades, said drive means rotating said cutting blades at a peripheral speed within the range of 10 to 20 times faster than that of the first said peripheral speed.

10. A machine according to claim 2 further comprising drive means above said rotating element for driving said rotating element and said cutting means, and underlying side piece means beneath said rotating element for supporting said drive means.

11. A machine according to claim 10, wherein said drive means comprises a drive shaft which extends through said rotating element, a hollow shaft disposed about said drive shaft, said rotating element being mounted on said hollow shaft, a gear block means coupling said drive shaft and said hollow shaft such that the speed of said drive shaft and the speed of said hollow shaft are different.

12. A machine according to claim 10, wherein said drive means comprises two substantially horizontally disposed drive shafts between two drawing-in and mowing means and extending transversely of the machine, said drive means further comprising a miter gear means coupling said two shafts, and a cardan shaft between said miter gear means and said chaff-blower.

13. A machine according to claim 2, wherein said draw-in and mowing locations are disposed generally rearwardly of said guide means, at least one of said guide means having a supporting surface cooperable with said gripper means to provide a draw-in space for said stalks with said draw-in space getting progressively smaller in the direction of rotation of said gripper means as said rotating element rotates.

14. A machine for harvesting and chopping up maize and similar stalk-type harvests comprising a chaff-blower, feed rollers for feeding cut stalks to said chaff blower, spaced guide means for guiding stalks to be cut, and at least one drawing-in and mowing means having a generally circular configuration and rotatable about a substantially vertical axis, said drawing-in and mowing means being operable to draw in and mow the stalks of the harvest in the upright position and subsequently deliver the cut stalks to said feed rollers with the cut-off ends of the stalks facing the feed rollers, said spaced guide means being disposed forwardly of said drawing-in and mowing means for guiding said stalks to a plurality of draw-in and mowing locations as said machine moves forwardly, said drawn-in and mowing locations being spaced along a peripheral portion of said drawing-in and mowing means, said spaced guide means comprising two outer guide elements disposed laterally outwardly of said drawing-in and mowing means, said two outer guide elements having forward extending end portions which are spaced from one another by a distance which defines the cutting width of the machine, said draw-in and mowing locations being spaced generally transversely across the space between said outer guide elements, said drawing-in and mowing means being operable to be moved forwardly to cut a plurality of stalks passing into the space between said outer guide elements and into said plurality of draw-in and mowing locations, said plurality of draw-in and mowing locations and said guide means being operable to harvest crops within said cutting width independently of the distance between the rows and the direction of the rows of said stalks to be harvested.

15. A machine according to claim 14, wherein said guide means are provided for guiding stalks to each of said draw-in and mowing locations.

16. A machine according to claim 15, wherein said plurality of draw-in and mowing locations and said guide means are disposed to provide for harvesting broadcast crops.

17. A machine for harvesting and chopping up maize or similar stalk-type harvests comprising a chaff-blower, feed rollers for feeding cut stalks to said chaff-blower, spaced guide means for guiding stalks to be cut, and drawing-in and mowing means rotatable about a substantially vertical axis and operable to draw in and mow the stalks of the harvest in the upright position and subsequently deliver the cut stalks to said feed rollers with the cut-off ends of the stalks facing said feed rollers, said spaced guide means being disposed fowardly of said drawing-in and mowing means as the machine is moved forwardly, said drawing-in and mowing means being operable to draw in and cut a plurality of stalks at a plurality of drawn-in and mowing locations spaced laterally across the front of the machine, and two transfer drawing-in and mowing means rotatable about substantially vertical axes and operable to draw in and mow the stalks of the harvest in the upright position and subsequently transfer the cut stalks to said drawing-in and mowing means such that the latter means delivers said transferred stalks to said feed rollers along with the stalks cut by said drawing-in and mowing means.

18. A machine according to claim 17, wherein said transfer drawing-in and mowing means are provided with a second rotating element rotatable about a substantially vertical axis, said second rotating element having second gripper means about the periphery thereof for engaging and displacing said stalks, and fixed passage means defining a passage for separating the stalks cut and transferred by said transfer drawing-in and mowing means from the stalks cut by said drawing-in and mowing means.

19. A machine according to claim 18, wherein a first transfer drawing-in and mowing means transfers cut stalks to an adjacent second drawing-in and mowing means and a third transfer drawing-in and mowing means transfers cut stalks to an adjacent fourth drawing-in and mowing means, said first and second means rotating in opposite directions, said third and fourth means rotating in opposite directions, said second and fourth means being disposed closest to said feed rollers to feed said cut stalks in the same direction toward the rear of the machine to said feed rollers.

20. A machine for harvesting and chopping up maize or similar stalk-type harvests comprising a chaff-blower, feed rollers for feeding cut stalks to said chaff-blower, spaced guide means for guiding stalks to be cut, and drawing-in and mowing means rotatable about a substantially vertical axis and operable to draw in and mow the stalks of the harvest in the upright position and subsequently deliver the cut stalks to said feed rollers with the cut-off ends of the stalks facing said feed rollers, said spaced guide means being disposed forwardly of said drawing-in and mowing means as the machine is moved forwardly, said drawing-in and mowing means being operable to draw in and cut a plurality of stalks at a plurality of drawn-in and mowing locations spaced laterally across the front of the machine, said drawing-in and mowing means comprising a rotating element rotatable about a substantially vertical axis, said rotating element having gripper means about the periphery thereof for engaging and displacing said stalks, and cutting means underlying said gripper means, and further comprising drive means rotating said rotating element such that the peripheral speed of said rotating element corresponds approximately to the traveling speed of the machine and is at least equal to the peripheral speed of the feed rollers, said gripping means comprising spaced gripping parts extending radially outwardly of a base circle on said rotating element, said spaced gripping parts defining receiving grooves therebetween for receiving said stalks, said grooves having a radial inner portion defining an operating zone which has a radial depth equal at least to the diameter of said stalks, said cutting means comprising spaced cutting blades rotatable in a position underlying said gripper means, the number and peripheral speed of said cutting blades at said operating zone being such as to provide said plurality of draw-in and mowing locations spaced laterally across the machine such that a plurality of stalks passing into the space between said guide means are cut as the machine moves forwardly.

21. A machine for harvesting and chopping up maize or similar stalk-type harvests comprising a chaff-blower, feed rollers for feeding cut stalks to said chaff-blower, spaced guide means for guiding stalks to be cut, and drawing-in and mowing means rotatable about a substantially vertical axis and operable to draw in and mow the stalks of the harvest in the upright position and subsequently deliver the cut stalks to said feed rollers with the cut-off ends of the stalks facing said feed rollers, said spaced guide means being disposed forwardly of said drawing-in and mowing means as the machine is moved forwardly, said drawing-in and mowing means being operable to draw in and cut a plurality of stalks at a plurality of drawn-in and mowing locations spaced laterally across the front of the machine, said drawing-in and mowing means comprising a rotating element rotatable about a substantially vertical axis, said rotating element having gripper means about the periphery thereof for engaging and displacing said stalks, and cutting means underlying said gripper means, at least one of said guide means being provided with a guide finger extending in the direction of rotation of said rotating element and into each of said draw-in and mowing locations, said guide finger together with said gripper means forming a holding chamber for the cut stalks.

22. A machine for harvesting and chopping up maize or similar stalk-type harvests comprising a chaff-blower, feed rollers for feeding cut stalks to said chaff-blower, spaced guide means for guiding stalks to be cut, and drawing-in and mowing means rotatable about a substantially vertical axis and operable to draw in and mow the stalks of the harvest in the upright position and subsequently deliver the cut stalks to said feed rollers with the cut-off ends of the stalks facing said feed rollers, said spaced guide means being disposed forwardly of said drawing-in and mowing means as the machine is moved forwardly, said drawing-in and mowing means being operable to draw in and cut a plurality of stalks at a plurality of drawn-in and mowing locations spaced laterally across the front of the machine, said drawing-in and mowing means comprising a rotating element rotatable about a substantially vertical axis, said rotating element having gripper means about the periphery thereof for engaging and displacing said stalks, and cutting means underlying said gripper means, drive means above said rotating element for driving said rotating element and said cutting means, underlying side piece means beneath said rotating element for supporting said drive means, said drive means comprising two substantially horizontally disposed drive shafts between two drawing-in and mowing means and extending transversely of the machine, said drive means further comprising a miter gear means coupling said two shafts, a cardan shaft between said miter gear means and said chaff-blower, and encasing means encasing said two drive shafts and said miter gear means in front of said feed rollers to assist in effecting a slanting disposition of said cut stalks as the latter are delivered to said feed rollers.

* * * * *